K. SCHULTZE.
PROPELLER FOR AIRCRAFT.
APPLICATION FILED JULY 3, 1913.

1,089,872.

Patented Mar. 10, 1914.

Witnesses:

Inventor
Kurt Schultze
by John Lotka
Attorney

UNITED STATES PATENT OFFICE.

KURT SCHULTZE, OF PANKOW, BERLIN, GERMANY.

PROPELLER FOR AIRCRAFT.

1,089,872.  Specification of Letters Patent.  Patented Mar. 10, 1914.

Application filed July 3, 1913. Serial No. 777,142.

*To all whom it may concern:*

Be it known that I, KURT SCHULTZE, a subject of the German Emperor, and a resident of Pankow, Berlin, Germany, have invented certain new and useful Improvements in Propellers for Aircraft, of which the following is a specification.

My invention relates to propellers adapted to work in the air and while capable of a more general application, it has been designed particularly for use on aircraft.

The invention has especial reference to propellers having flexible portions or "sails" secured to rotating disks or wheels arranged at an angle to each other.

My invention, as fully set forth hereinafter, presents (as compared with existing propellers of this type), the advantage of securing a large surface for the downwardly moving operative members of the wheel or propeller, while keeping the weight comparatively low. For this purpose, I have arranged, between the two disks rotating at an angle to each other, a third disk to which the operating members connecting the other two disks are secured. Owing to the provision of this intermediate disk, the flexible covering of each operative wing will consist of two parts arranged at an angle to each other, the aggregate efficient area of which is materially greater than the corresponding surface of the operating member in the case of the old type of propeller having only two disks at an angle to each other. Preferably the outer disks are disposed with their planes at a right angle to each other, since with this arrangement the maximum of surface is obtained for each operating member or wing. Furthermore, it is desirable to make the intermediate disk of a larger diameter than the two outer disks, this arrangement securing an additional increase in the size of the operating members or wings.

Owing to the arrangement of the intermediate disk, the two outer disks may be provided with rods or spokes extending inwardly in conical fashion and having the flexible cloth members or "sails" secured to them. With this construction, the operating members, wings, or "sails" will fold together entirely during their upstroke, so as to reduce to a minimum the resistance opposed to the effective work of the propeller.

Figure 1:
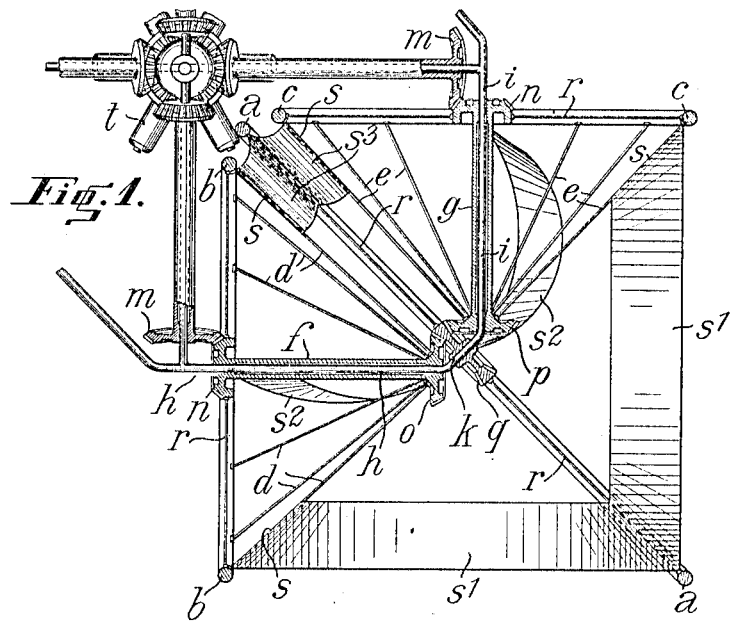
Figure 2:
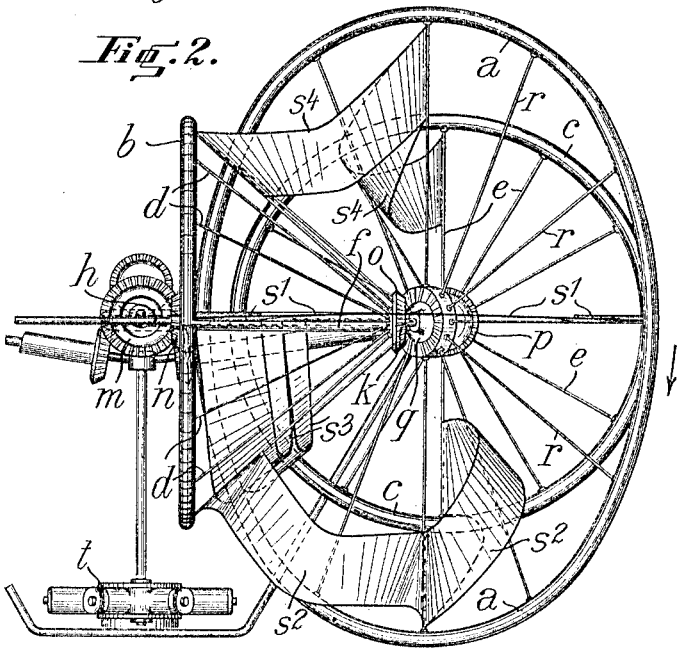

Reference is to be had to the accompanying drawing, in which an example of my invention has been illustrated, Figure 1 being a plan view of the improved propeller, with parts in section, and Fig. 2 a side elevation thereof.

In the case of the propeller illustrated by the drawing, the disks or wheels are formed of rims and spokes. The central or intermediate rim $a$, which is of a larger diameter than the two outer rims $b$, $c$, is provided only with radial rods or spokes $r$, while the outer rims $b$, $c$, in addition to radial spokes $r$, have bracing spokes $d$ and $e$ respectively, arranged to form a conical surface. The rims $b$ and $c$ each have as many spokes $d$ and $e$ respectively as the rim $a$ has spokes $r$, and these spokes are so arranged that a spoke $r$ of the rim $a$ will lie in the same plane with the spoke $d$ of the rim $b$ and with a spoke $e$ of the rim $c$. All spokes $d$, $r$, or $e$, $r$, belonging to the rim $b$ or $c$ respectively are connected by a hub $f$ or $g$ respectively. These hubs are mounted to turn on fixed axles $h$ and $i$ respectively.

The axles $h$ and $i$ are preferably at a right angle to each other, and their connecting portion $k$ forms a support or bearing for the intermediate rim $a$. Those spokes $r$, $d$, $e$, of the three rims $a$, $b$, and $c$ which are in the same planes are connected by operating members or strips made of cloth or other suitable material. In a propeller embodying my invention, there are therefore as many operating members of cloth or other suitable flexible material as there are spokes $r$ for each rim. In the drawing, each rim is shown as made with twelve spokes $r$, so that this particular propeller would have twelve flexible strips or operating members. In order to avoid confusion of lines, however, only four of these twelve operating members, $s^1$, $s^2$, $s^3$, $s^4$, have been shown in the drawing.

As the propeller rotates, the arrangement of the axles $h$, $i$, at an angle to each other will cause the flexible operating members to be spread out or drawn tight on one side, as indicated at $s^1$, and to be folded together entirely on the opposite side, in a double fold after the fashion of a W, as indicated at $s^3$. Thus, when the propeller revolves, the operating members on one side of the wheel or propeller will form surfaces of considerable resistance, while on the other side the folding of the flexible operating members will reduce the resistance to the air considerably, in fact almost to the vanishing point. It will be evident that the propeller should revolve in such a direction that the side having the taut operating members (such as $s^1$) will move downward, so as to force the air downward and produce an upthrust.

The outer rims $b$, $c$, may be driven in any suitable manner, as by bevel gearing $m$, $n$, operated by the engine $t$, or by sprocket chains etc. It is not necessary to drive the intermediate rim $a$, for the reason that the flexible operating members connecting said rim with the other rims $b$, $c$ respectively, will cause the rim $a$ to follow the rims $b$, $c$, in their rotation. If desired, however, a direct drive may be provided for the rim $a$, as by means of bevel gears $o$, $p$, secured to the ends of the hubs or sleeves $f$ or $g$ respectively and meshing with two sets of teeth on the hub $q$ of the rim $a$. Instead of rims, I may employ simple spiders or the like. This modification and others may be made without departing from the nature of my invention as defined in the appended claims.

I claim as my invention:

1. A propeller comprising two disks mounted to rotate at an angle to each other, flexible operating members connecting said disks, and a third disk located between the first-named disks, the flexible operating members being secured to said intermediate disk.

2. A propeller comprising two disks mounted to rotate in planes at a right angle to each other, flexible operating members connecting said disks, and an intermediate disk to which said members are secured.

3. A propeller comprising two disks mounted to rotate at an angle to each other, flexible operating members connecting said disks, and an intermediate disk, of larger diameter than the other disks, and having the said members secured to it.

4. A propeller comprising disks mounted to rotate at an angle to each other and provided with converging conically arranged spokes, and flexible operating members connecting said disks and secured to the conically converging spokes.

5. A propeller comprising two disks mounted to rotate at an angle to each other, axles supporting said disks and connected with each other, an intermediate disk mounted on the portion connecting said axles, and flexible operating members connected with said disks.

In testimony whereof, I have signed this specification in the presence of two subscribing witnesses.

KURT SCHULTZE.

Witnesses:
PAUL ARRAS,
JAMES L. A. DURRELL.

Copies of this patent may be obtained for five cents each, by addressing the "Commissioner of Patents, Washington, D. C."